Nov. 23, 1954 M. BRAIBANTI ET AL 2,694,986
MACHINE FOR CUTTING AND SUSPENDING LONG BUNDLES OF
THREADS OF DOUGH ON ONE OR MORE PARALLEL BARS
Filed Sept. 4, 1952 6 Sheets-Sheet 1
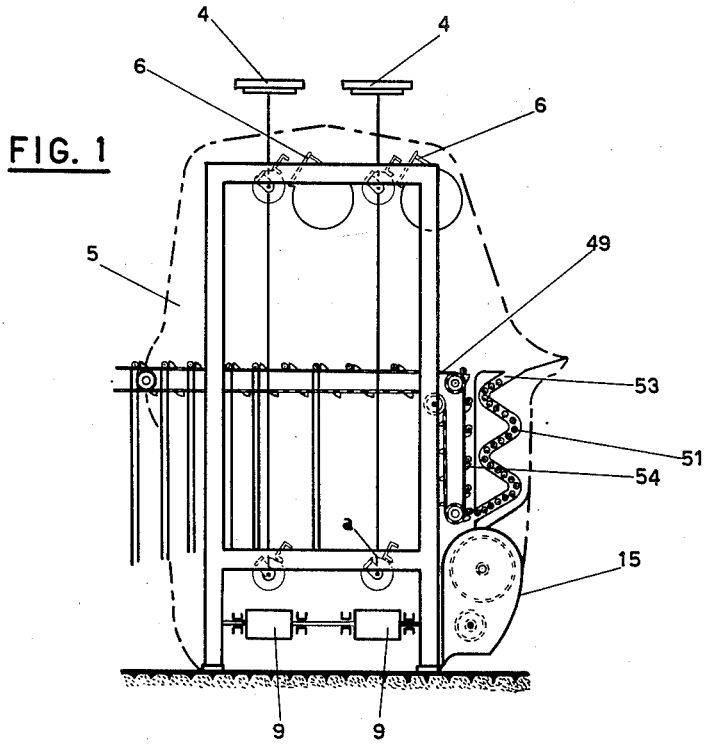
FIG. 1
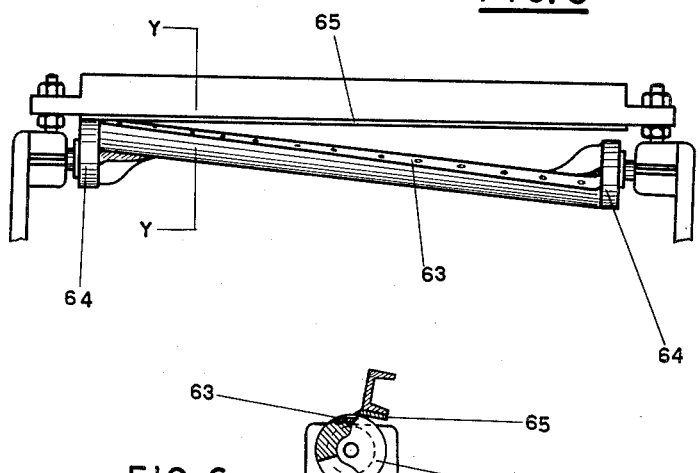
FIG. 5
FIG. 6
INVENTORS
MARIO BRAIBANTI
GIUSEPPE BRAIBANTI
BY:
Haseltine, Lake & Co.
AGENTS

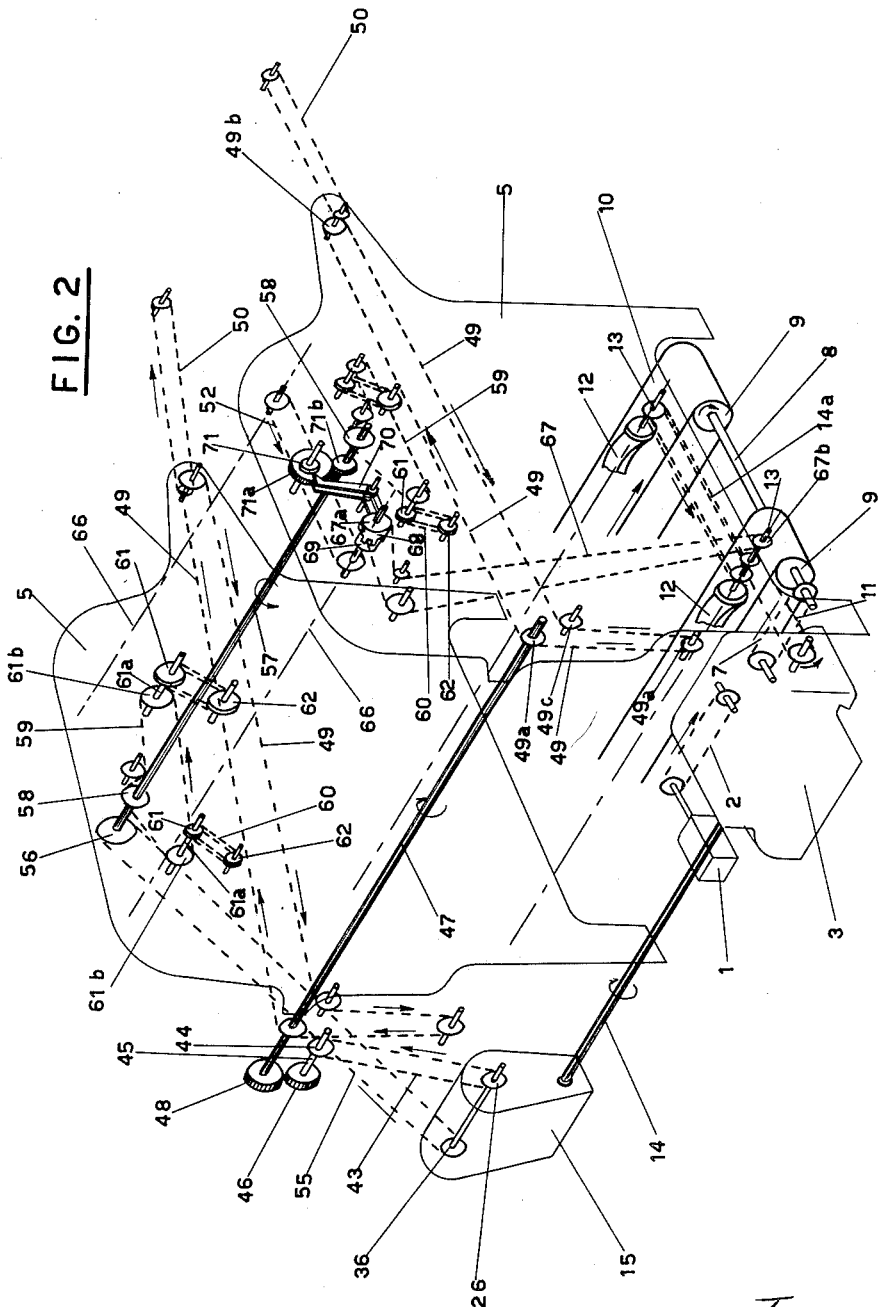

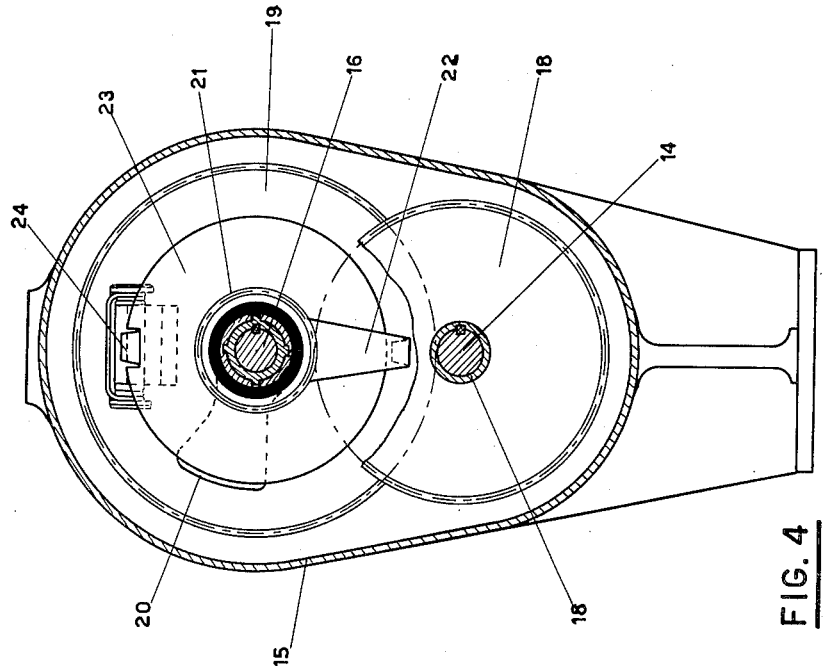
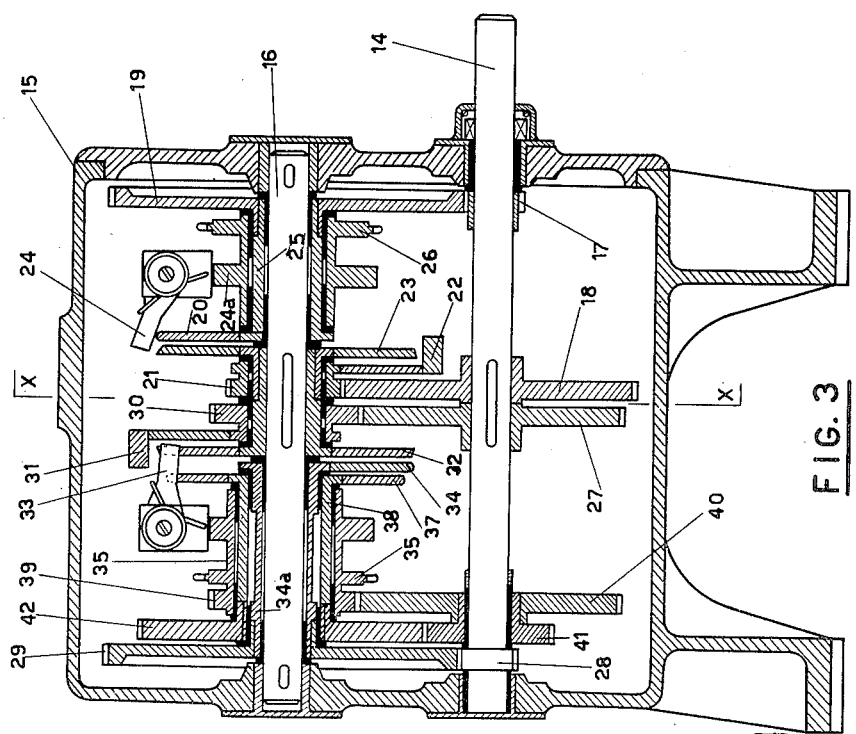

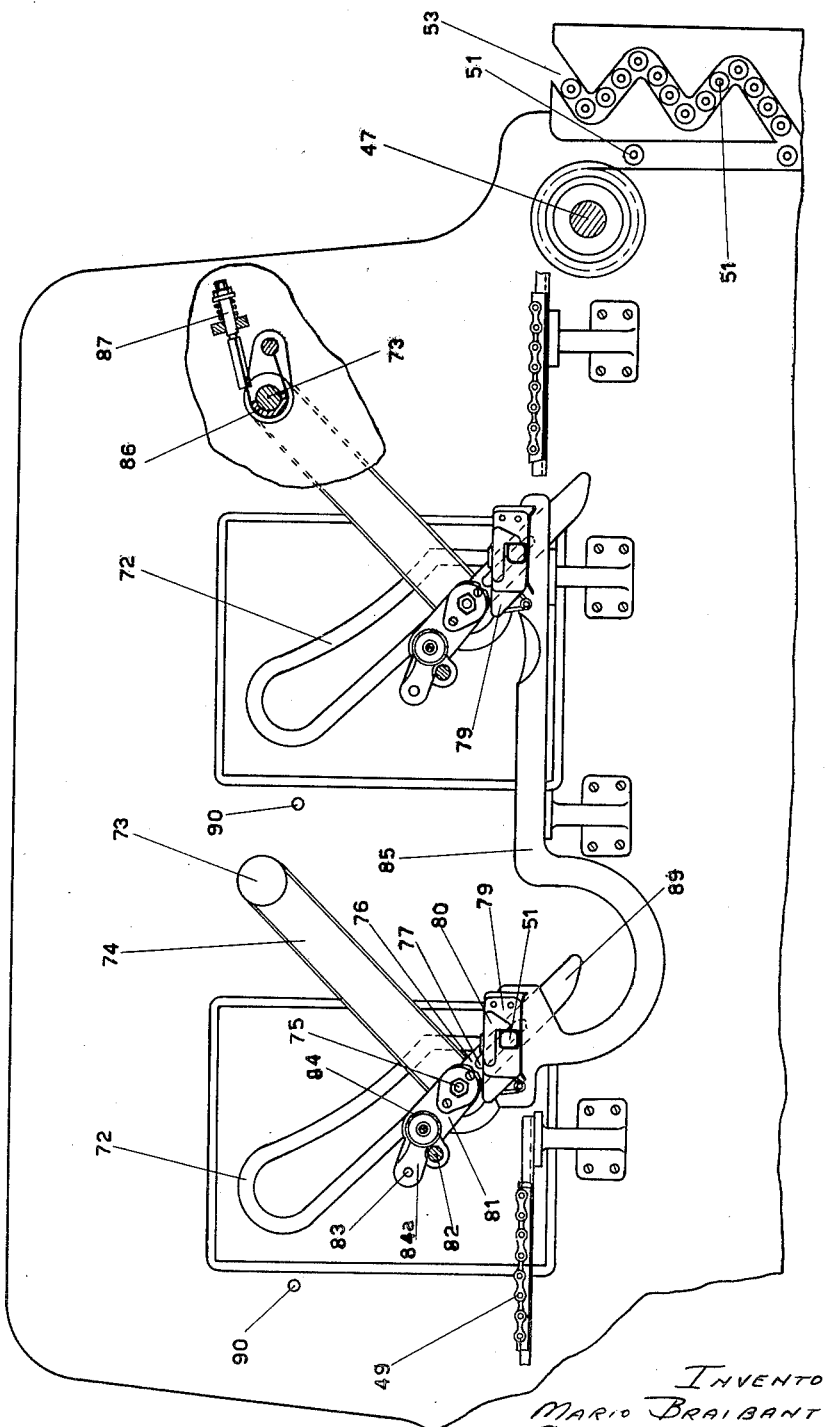

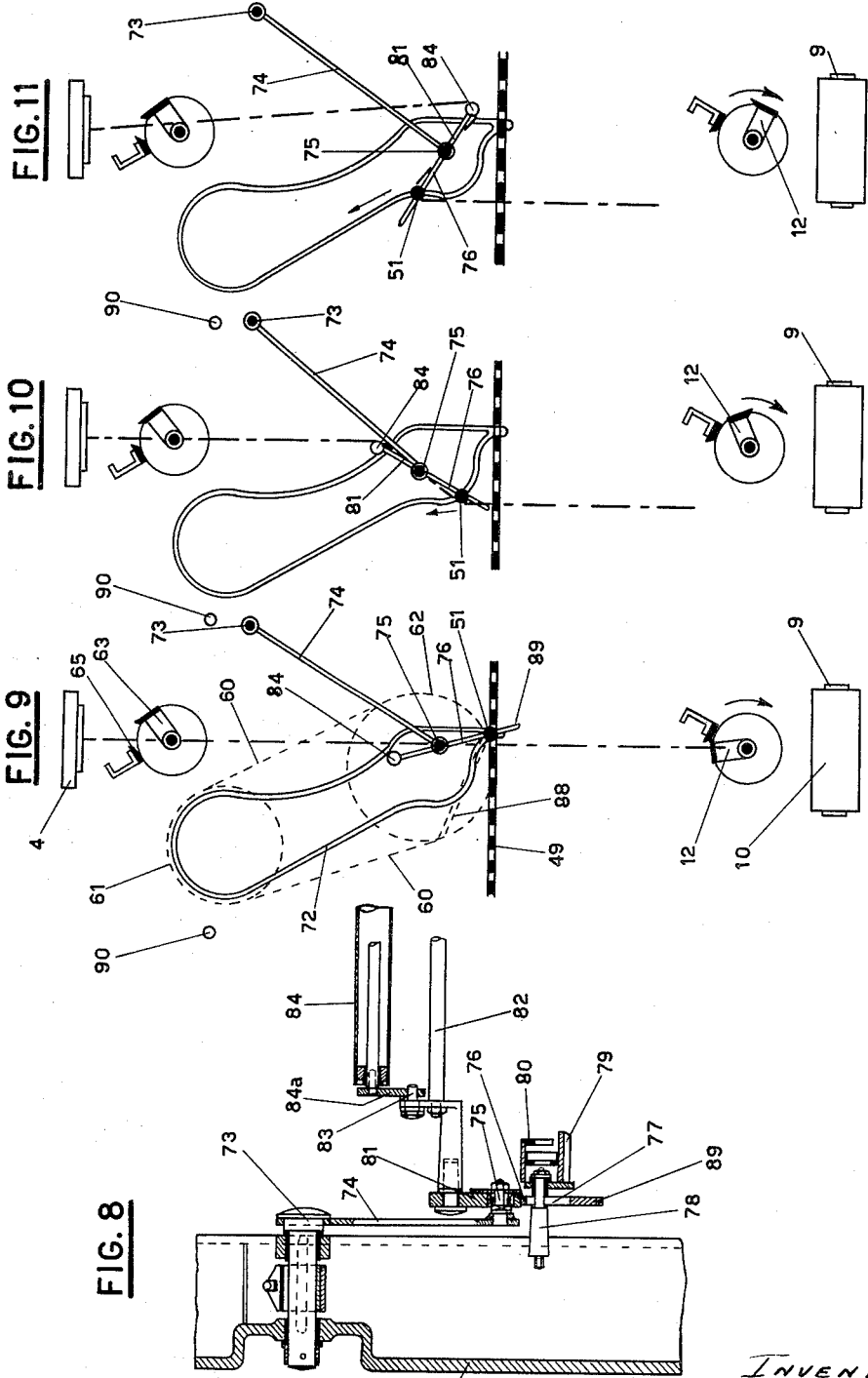

Nov. 23, 1954 M. BRAIBANTI ET AL 2,694,986
MACHINE FOR CUTTING AND SUSPENDING LONG BUNDLES OF
THREADS OF DOUGH ON ONE OR MORE PARALLEL BARS
Filed Sept. 4, 1952 6 Sheets-Sheet 6
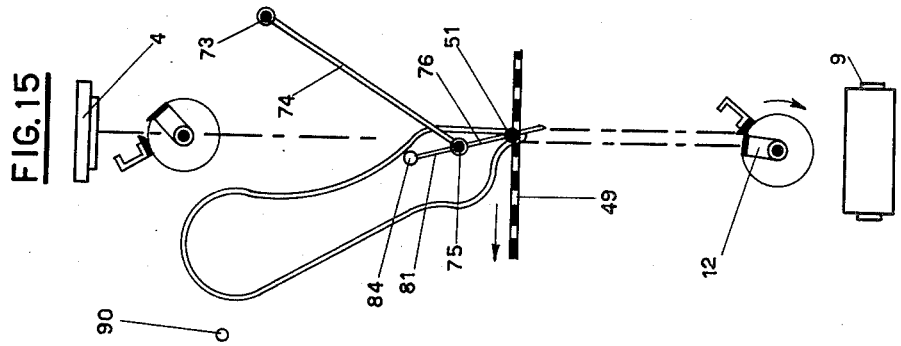
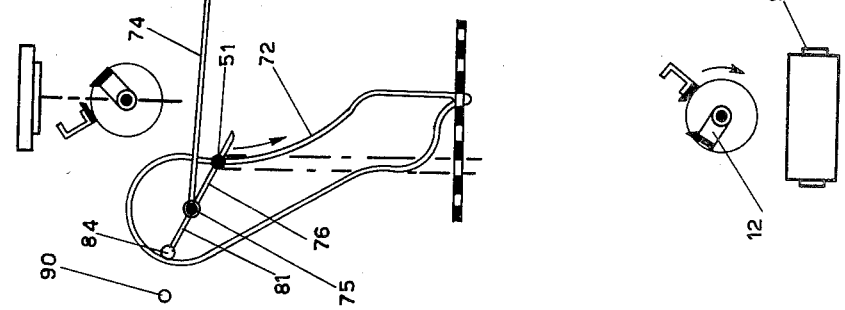
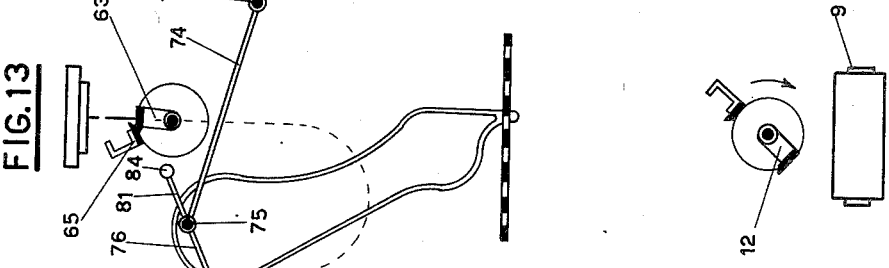
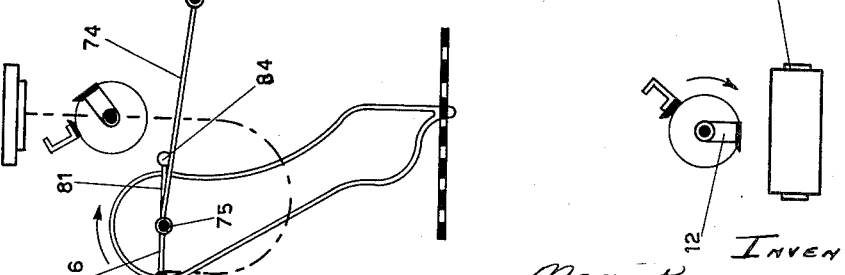
INVENTORS
MARIO BRAIBANTI
GIUSEPPI BRAIBANTI
By: Haseltine, Lake & Co.
AGENTS

United States Patent Office 2,694,986
Patented Nov. 23, 1954

2,694,986

MACHINE FOR CUTTING AND SUSPENDING LONG BUNDLES OF THREADS OF DOUGH ON ONE OR MORE PARALLEL BARS

Mario Braibanti and Guiseppe Braibanti, Milan, Italy

Application September 4, 1952, Serial No. 307,871

Claims priority, application Italy May 6, 1949

14 Claims. (Cl. 107—21)

The present invention relates to a machine for cutting and suspending elongated threads or strands of dough, extruded in long skeins from banks of nozzles, on one or more parallel conveyor bars. This application is a continuation-in-part of application Serial No. 144,548, filed February 16, 1950, now abandoned.

In known machines of this kind the threads or strands of dough are suspended on the conveyor bars by having the latter first move transversely across the perpendicular plane of emergence of the threads of dough, and then, by means of suitable devices, causing the conveyor bars to execute a rotary motion about a crossbar fixedly mounted in the frame of the machine, whereby the threads of dough are prevented from slipping on the bars and assume an S-shaped form. The conveyor bars then execute a combined horizontal and vertical motion so that, in order to trim the ends of the threads suspended on the bars, a shear must be provided other than that which trims the threads descending from the bank of nozzles. However, such known machines produce very long trimmings not readily re-usable in the kneading means of the automatic machines.

Accordingly, it is an object of the present invention, to provide a machine of the described character wherein the trimming operation produces small scraps which can readily be processed for re-use, and symmetrical suspension of the threads on the bars is ensured throughout their entire length, by employing the otherwise known elements of such machines, such as shears, conveyor bars, and the like in the arrangement, form and association with other mechanism hereinafter described.

In accordance with the invention, for each set of bars to be loaded at one time, two shears with horizontal cutting planes are provided at different levels in the vertical plane extending through the banks of dough extruding nozzles, with the lower shear operating continuously in rapid cutting sequence, while the upper shear acts intermittently and with longer time intervals between cuts. The lower, continuously operating shear serves initially to section the threads of dough extruded from the banks of nozzles and later to trim both trailing ends of the threads after they have been hung on the conveyor bars, thus producing re-usable short trimmings.

Also, in accordance with the present invention, an endless conveyor means is provided for the bars moving transversely to the plane of emergence of the threads and preferably horizontally, with the line of intersection of the plane of emergence of the threads and the conveyor being higher than the lower shear by about half the desired length of the bundles of threads to be trimmed. Special driving means is provided for intermittently advancing the bars in such a manner that the conveyor comes to a stop whenever a bar is immediately ahead of the said line of intersection with the plane of emergence of the threads of dough.

Another essential component of the machine embodying the invention comprises a lever assembly provided on the opposite side walls of the machine for each set of bars to be loaded at one time, and actuating carriers suitable for grasping the related bar at both ends in its position of rest immediately ahead of the plane of emergence of the bundles of threads, to lift the bar off the aforesaid conveyor means and subject the lifted bar to a rotational movement, during which the bar returns to the other side of the said plane of emergence and thus to its original position and is finally re-deposited on the conveyor means. Each of these lever assemblies essentially comprises a lever rotatable about a fixed point on the wall of the frame and pivotally connected at its end to a double-armed lever which at the end of one arm supports the related end of a crossbar for guiding the bundles of threads while a slit in its other arm receives a pin which guides a device for grasping and supporting the bars. This pin also slides along a cam track or groove on the adjacent wall of the frame of the machine, and is so driven by suitable means that it executes a positive motion along the cam track, as explained in more detail below. This positive motion, which involves a full revolution of the said guide pin through the closed or continuous cam track, occurs whenever the conveyor means for the bars has come to a stop, and ceases when the bars, which have meanwhile been loaded with the threads of dough, are redeposited on the conveyor means. Simultaneously with the rotary motion of the bars, the crossbar supported by the double-armed levers executes a swinging motion about the pivot of the double lever, namely first in one direction to guide the bundles of threads descending from the extrusion nozzles and for deposit on the bar without sliding, and then in the opposite direction back to its original position.

The distribution of the bars on the conveyor means, and the advance thereof during each operating cycle of the machine, depends on the number of bars to be loaded at one time. If, for example, two bars are to be hung with threads at one time, the distance between the planes of emergence of the threads of dough will be equal to three times the distance between two adjacent bars on the conveyor means, and the travel of the conveyor during each operating cycle will be equal to twice the distance between two adjacent bars. A correspondingly modified arrangement will of course result if more than two bars are to be loaded at once, that is, in general the spacing of the bars on the conveyor means will be equal to $1/(x+1)$ of the distance between the two adjacent planes of emergence (where $x$ is the number of such planes provided), and the advance travel of the conveyor means will in each instance be equal to $x$ times the spacing of the bars. This spacing implies the possibility of unimpeded suspension of the bundles of threads on more than one bar, without requiring an excessive rate of advance of the bar conveyor means and without interference of the threads with the passage of the empty bars.

Successful operation of the described machine, particularly when several bars are to be loaded simultaneously, requires that the various intermittent motions, such as the advance of conveyor means, the positive motion for removing and returning the bars from and to the conveyor means and the actuation of the upper shear, be accurately synchronized, and that the motions themselves be rapid without overlapping. This important requirement is met, pursuant to the invention, by means of a transmission which converts the continuous rotary motion of the shaft of an ordinary drive motor, in the proper succession of phases, into the various intermittent motions.

The accompanying drawings, by way of example, show an illustrative embodiment of a machine constructed according to the invention, wherein two bars are simultaneously subjected to the same operations. It will be apparent, however, that the inventive features therein illustrated are likewise applicable in principle to machines in which only one or more than two bars are simultaneously subjected to the same operations.

In the drawings:

Fig. 1 shows a schematic vertical section through a machine embodying the present invention;

Fig. 2 is a diagrammatic perspective view of the transmission systems for the several parts of the machine;

Fig. 3 is a vertical, axial section through a transmission included in the systems of Fig. 2;

Fig. 4 is a transverse sectional view taken along the line X—X of Fig. 3;

Fig. 5 is a detail front elevational view of a shear included in the illustrated embodiment;

Fig. 6 is a sectional view taken along the line Y—Y of Fig. 5;

Fig. 7 represents a fragmentary side elevational view, partly broken away and in section, of one side frame of the machine;

Fig. 8 is a transverse sectional view of one of the systems of levers shown in Fig. 7; and Figs. 9 to 15 diagrammatically show various phases of the operating cycle of the illustrated machine.

The arrangement and operation of the several parts making up a machine embodying the present invention will now be described, with special reference being initially made to Figs. 1 and 2 of the drawings.

The illustrated machine includes a frame formed of spaced apart side members 5. All of the operating parts of the machine are driven by a motor 1 which may be accommodated at the base of the frame. The motor 1 is operatively connected, by a pulley and belt or sprocket and chain arrangement 2 to a suitable speed reducer 3, shown schematically in Fig. 2. The speed reducer 3 includes various gear trains for synchronizing the movements of the parts driven by the motor 1 with the speed at which dough is extruded from suitable conventional nozzles, disposed above the machine.

The dough is extruded downwardly from the nozzles 4 into the space between the side frame members 5, and fans or blowers 6 are preferably provided at the top of the frame (Fig. 1) to dry the extruded dough. The fans or blowers 6 are driven by motors other than the drive motor 1, and the nozzles 4 are continuously operated and arranged in transversely extending rows so that each row of extruding nozzles provides a transverse curtain of filaments or strands of dough.

The speed reducer 3 is operative to drive a shaft 8 which extends fore and aft at the bottom of one side of the machine, and a sprocket and chain transmission 7 is provided for effecting the driving connection between the reducer 3 and shaft 8. Rollers 9 are provided on the shaft 8 at locations in vertical alignment with the rows of extruding nozzles 4 and similar rollers (not shown) are rotatably supported at the opposite side of the machine to support continuous conveyor belts 10 which move transversely across the lower portion of the machine for carrying away the scraps of dough resulting from the hereinafter described trimming operations.

A lower shearing assembly 12 is provided above each of the conveyor belts 10 and includes a transversely extending rotatable shearing blade and a fixed blade. The remaining structure of each lower shearing assembly will be more fully described at a later point in this description. Each blade 12 has a shaft 13 extending therefrom, and one of the shafts 13 is connected to the reducer 3 by a suitable sprocket and chain arrangement 11 (Fig. 2). Another sprocket and chain assembly 14a operatively connects the shafts 13 of the lower shearing assemblies to each other so that the rotated blades of the latter are synchronously driven.

The reducer 3 also drives a shaft 14 which connects to the driven side of a transmission assembly, generally indicated by the reference numeral 15. The transmission assembly 15 is shown in detail in Figs. 3 and 4 and includes a housing into which the shaft 14 rotatably extends. The transmission assembly 15 serves to convert the continuous rotational movement of the shaft 14 into intermittent rotation and includes a fixed shaft 16 supported within the housing in parallel and spaced apart relation to the shaft 14.

A relatively small spur gear or pinion 17 and a relatively large spur gear 18 are keyed to the shaft 14 within the transmission housing and the gear 17 meshes with a spur gear 19 which is rotatably mounted on the fixed shaft 16. The gear 19 is fixed to one end of a sleeve 25 which is rotatable about the shaft 16, and a radial cam 21 is mounted on the end of sleeve 25 remote from the gear 19. The gear 18 on shaft 14 meshes with a gear 21 which is also rotatable about the fixed shaft 16, and the gear 21 is fixed to a cam member having an axial lug or projection 22 thereon. Thus, the rotation of shaft 14 will produce rotation of the radial cam 20 and the cam lug 22 at different rotational speeds.

A fixed disc 23 is provided on the fixed shaft 16 between the rotating paths of the cam 20 and lug 22 and is formed with a notch in the periphery thereof. A sleeve 24a is rotatably mounted on the sleeve 25 and carries an axially extending pawl 24 which is spring urged in the radial inward direction for engagement in the notch formed in the periphery of fixed disc 23. As seen in Fig. 3, the pawl 24 extends across the path of travel of the radial cam 20 and into the radial plane extending through the circular path of the cam lug 22. When the high portion of radial cam 20 engages the pawl 24, the latter is lifted out of the notch of the fixed disc 23 and into the path of cam lug 22 so that the latter is then effective to drive the pawl 24 and the sleeve 24a before it until the pawl 24 again drops into the notch in the periphery of disc 23. When the pawl 24 is received in the peripheral notch of the fixed disc 23, radial clearance is provided between the cam lug 22 and the pawl and the latter is held immobile by the fixed disc. Thus, the sleeve 24a is rotated only when the pawl 24 is displaced radially outward by the action of cam 20. The sleeve 24a also carries a sprocket 26 which is intermittently rotated with the sleeve 24a to produce the desired movements of certain parts of the machine, as will hereinafter more fully appear.

The transmission assembly 15 further includes axially spaced gears 27 and 28 of different sizes keyed to the shaft 14 within the transmission housing. The gear 27 meshes with a spur gear 30 which is rotatable about the fixed shaft 16 and drives a cam lug 31, while the gear 28 meshes with a spur gear 29 which is also rotatable about the fixed shaft 16. The gear 29 is secured to a sleeve 34a which is rotatable on the shaft 16 and carries a radial cam 34 at the end of the sleeve adjacent the orbital path of the cam lug 31.

A fixed disc 32 is provided on the shaft 16 between the cam 34 and the path of cam lug 31, and disc 32 is formed with a peripheral notch. A sleeve 38 is rotatably mounted on the sleeve 34a, and an outer sleeve 35 is rotatably mounted on the sleeve 38 so that the sleeves 34a, 35 and 38 may rotate independent of each other. The sleeve 35 pivotally carries a pawl 33 which extends axially across the path of the radial cam 34 and is spring urged radially inward to fit into the peripheral notch of the fixed disc 32. When the high portion of cam 34 engages the pawl 33, the latter is lifted out of the peripheral notch of the disc 32 and into the orbital path of the cam lug 31 so that the latter is then effective to cause rotation of the sleeve 35. The sleeve 35 carries a sprocket 36 which is employed for the purpose of intermittently driving parts of the machine, as will hereinafter more fully appear. However, the timing of the intermittent rotation of sprocket 36 is controlled by elements in addition to the radial cam 34, and these additional elements include a rotatable disc 37 carried by the sleeve 38 and having a peripheral notch for receiving the pawl 33. It is apparent that the pawl 33 may move radially inward out of the path of cam lug 31 to interrupt the rotation of the sprocket 36 only when the peripheral notches of the discs 32 and 37 are in axial alignment. However, the sleeve 38 and disc 37 are rotated about the fixed shaft 16 and, therefore, the operative periods of the sprocket 36 will depend upon the speed of rotation of the sleeve 38.

In order to rotate the sleeve 38, the outer sleeve 35 also carries a spur gear 39 which meshes with a gear 40 mounted rotatably on the drive shaft 14. That is, the gear 40 is rotatable relative to the shaft 14. The gear 40 is fixed to an adjacent gear which is also rotatable on the shaft 14, and the gear 41 meshes with a gear 42 fixed to the sleeve 38. Thus, rotation of the sleeve 35 will produce rotation of the sleeve 38 carrying the notched discs 37, and the relative speeds of rotation of the sleeves 35 and 38 will depend upon the gear ratios of the gears 39, 40, 41 and 42.

For the present, it will be noted that the sprocket 26 controls the intermittent advance of a conveyor for carrying bars upon which the extruded dough is to be hung, while the sprocket 36 controls the intermittent operation of devices which act, during halts in the operation of the conveyor, to lift and manipulate the bars for disposing the strands of dough on the latter, and also controls the operation of upper shearing assemblies as hereinafter described in detail.

In the illustrated machine embodying the present invention elongated, transversely extending bars 51 are successively moved through the machine, from the front to the back thereof, along a horizontal path which intersects the plane of the strands of dough extruded downwardly from the rows of nozzles 4. The horizontal path followed by the bars 51 in moving through the machine is preferably spaced upwardly from the lower shears 12 by a distance substantially equal to one-half of the desired finished or trimmed length of each strand of dough. This horizontal path is preferably defined by the upper runs of endless conveyor chains 49 arranged adjacent the side frame members 5 and extending over suitable sprockets 49a and 49b at the front and rear of the machine. Each conveyor chain 49 runs toward the rear of the machine from the sprocket 49a to the sprocket 49b. At the rear of the machine the chain 49 extends around the sprocket 49b and returns forwardly along a lower run to a guide or idler sprocket 49c. The chain 49 passes downwardly over the sprocket 49c and under an idler sprocket 49d disposed adjacent the bottom of the machine. Finally, the chain 49 moves upwardly from the sprocket 49d to the sprocket 49a.

The bars 51 are preferably stored in a magazine at the front of the machine which is provided by zig-zag grooves or slots 53 in the side frame members 5 to receive the opposite ends of the bars 51. The slots 53 (Figs. 1 and 7) open upwardly to receive the bars, which may be manually loaded into the magazine, and the lower ends of the slots 53 open adjacent the lower portions of the runs of the chains 49 extending between the sprockets 49d and 49a. Suitable hooked members 54 are provided at spaced locations on the chains 49 to raise the successive bars 51 one at a time from the discharge ends of the magazine slots 53 and to carry such bars along the horizontal path defined by the chain runs between the sprockets 49a and 49b.

The conveyor chains 49 are driven by a drive shaft 47 (Fig. 2) on which the sprockets 49a are preferably keyed. The rotation of shaft 47 is derived from the sprocket 26 of the previously described transmission assembly 15. The connection between shaft 47 and sprocket 26 includes an intermediate rotatable shaft 45 extending parallel to the shaft 47 and having a sprocket 44 and a gear 46 fixed thereon. A chain 43 runs around the sprockets 26 and 44 to drive the intermediate shaft 45, and the gear 46 meshes with a gear 48 fixed on the shaft 47.

Thus, the conveyor chains 49 and the bars 51 propelled by the hook members 54 provided on the chains are intermittently advanced through the machine. In accordance with the present invention, the distance between the vertical planes of the strands of dough extruded from the rows of nozzles 4 has a predetermined relationship to the distance between successive hook members 54 on the conveyor chains 49 and to the distance which the conveyor chains are advanced during each operating cycle of the machine. This predetermined relationship may be expressed as follows:

If $x$ equals the number of rows of dough extruding nozzles 4 provided above the machine, the distance between the successive hook members 54 on the conveyor chains 49 is equal to $1/(x+1)$ of the distance between the vertical planes of the strands of dough extruded from the rows of nozzles 4. Thus, in the illustrated embodiment including two rows of nozzles, the distance between the successive hook members 54 is equal to ⅓ of the distance between the planes of the dough extruded from the two rows of nozzles, as indicated on Fig. 1.

Further, the conveyor chains 49 are advanced a distance, during each operating cycle of the machine, which is equal to the product of $x$ (the number of rows of extruding nozzles) and the distance between the successive hook members 54 on the chains 49. Thus, in the illustrated embodiment, the chains are advanced a distance equal to ⅔ of the distance between the two planes of strands of extruded dough during each cycle of the machine.

It is to be understood that the hook members 54 are located on the chains 49 so that the members 54 come to rest immediately in front of the vertical planes of the extruded strands of dough when the pawl 24 on the sleeve 24a driving the sprocket 26 engages in the peripheral notch of the fixed disc 23 in the transmission assembly 15. The distance travelled by the hook members 54 during each operating cycle of the machine is controlled by the ratio of the gears 46 and 48 (Fig. 2), and this ratio is selected to obtain the desired travel as specified above.

A drive shaft 57 (Fig. 2) extends transversely across the top of the machine and is journalled at its opposite ends in the side frame members 5. A sprocket 56 is fixed on one end of the drive shaft 57, and a drive chain 55 runs over the sprocket 56 and the sprocket 36 of the transmission assembly 15, so that the shaft 57 is intermittently rotated. The parts of transmission assembly 15 associated with the sprocket 36 thereof are arranged so that the sprocket 36 is rotated only during the periods when the sprocket 26 is at rest. That is, the cam 34 operates to lift the pawl 33 out of the peripheral notches of the discs 32 and 37 only when the pawl 24, associated with the sprocket 26, is received in the peripheral notch of the disc 23. Thus, the shaft 57 is rotated only when the conveyor chains 49 are at rest.

An upper shearing assembly is provided below each bank or row of extruding nozzles 4 in vertical alignment with the corresponding lower shearing assembly 12. In Figs. 5 and 6, the constructional features of an upper shearing assembly are illustrated, however, it is to be understood that each of the lower shearing assemblies is of the same construction. As seen in Figs. 5 and 6, each of the shearing assemblies includes a helically twisted blade 63 carried at its opposite ends by discs 64 which are journalled in suitable brackets mounted upon fixed parts of the machine frame. A transversely extending fixed blade 65 is mounted tangentially to the rotatable blade 63 at the top of the circular path followed by the latter, so that the rotatable and fixed blades come into shearing relationship as the rotatable blade moves through its top dead center position (Fig. 6). Thus, the cutting action of the rotatable and fixed blades is in a horizontal plane which intersects the vertical plane of the strands of dough extruded from the related bank or row of nozzles.

While the lower shearing assemblies operate continuously, the upper shearing assemblies operate only intermittently. In order to produce such intermittent operation of the upper shearing assemblies, each of these shearing assemblies has a shaft 66 (Fig. 2) extending from the rotatable blade 63 thereof. The shaft 66 of one of the upper shearing assemblies has a clutch of conventional design interposed therein and including a driving portion 68 and a driven portion 69. The driving portion 68 of the clutch is continuously rotated by connection to the shaft 13 of one of the lower shearing assemblies 12, and this connection preferably includes a chain 67 running over a sprocket 67a, fixed to the clutch portion 68, and a sprocket 67b, fixed on the shaft 13 of the lower shearing assembly.

Engagement and disengagement of the clutch portions 68 and 69 are timed by the shaft 57, and for this purpose the shaft 57 has a gear 71b thereon meshing with a gear 71a provided on a cam shaft. A cam 71 rotates with the gear 71a and is operative to rock a double bell-crank 70 which axially displaces the clutch portions 68 and 69 relative to each other in a well known manner. Thus, the cam 71 controls the engagement and disengagement of the clutch so that the upper shearing assembly associated with the clutch is intermittently driven from one of the lower shearing assemblies. Further, a sprocket and chain assembly 52 connects the shafts 66 of the two upper shearing assemblies so that the rotatable blades of the latter are operated in synchronism with each other.

The shaft 57 also serves to operate the devices, hereinafter described, for manipulating the bars 51 when the conveyor chains 49 are at rest. For that purpose, sprockets 58 are secured on the shaft 57 adjacent the opposite ends of the latter and intermittently drive chains 59. Each of the chains 59 is trained over a sprocket 61b for each of the rows or banks of extruding nozzles associated with the machine. Each sprocket 61b is mounted on a shaft 61a journalled in the adjacent side frame member and carrying a double sprocket 61 (Fig. 2). Another double sprocket 62 is rotatably supported in a position below, and slightly in front of, each of the double sprockets 61, and a double chain 60 runs around the sprockets 61 and 62. Each of the chains 60 serves to actuate a bar manipulating device which is operative to lift an end of a bar from the conveyor chains 49 for suspending the strands of dough on the bars and then to return the bar to the conveyor chains for further advance through the machine.

A bar manipulating device is provided at each side of the machine for each row or bank of extruding nozzles and, as shown on Figs. 7 and 8, each of these devices includes an arm or lever 74 which is secured at one end to an axle or pivot pin 73 journalled in suitable bearings in the adjacent side frame member 5. Thus, the lever 74 is free to rotate in a plane adjacent the inner side of the side frame member. At its end remote from the pivot pin 73, the lever 74 has a pin 75 extending therefrom and a lever is rotatably mounted, intermediate its ends, on the pin 75. The lever mounted on pin 75 includes two arms 76 and 81 extending in opposite directions from the axis of rotation thereof defined by the pin 75. The lever arm 76 is formed with a longitudinal slot 77 which slidably receives a stub shaft or pin 78. A bar carrier 79 is rotatably mounted on the end of pin 78 extending away from the adjacent side frame member. As a bar 51 is carried by the chains 49 into its position of rest immediately in front of the plane of the strands of dough extruded from an overhead bank of nozzles, the opposite ends of the bar move onto the bar carriers 79 associated with that bank of nozzles. Further, each carrier 79 is provided with a latch 80 which is pivotally mounted thereon for up and down swinging and is spring urged into a position in which the bill of the latch 80 engages in back of the bar 51 on the bar carrier (Fig. 7) to hold the bar 51 in a position axially aligned with the pin 78. The bill of the latch 80 is formed with an inclined front edge to ride over the bar 51 as the latter is driven onto the bar carrier by the conveyor chains.

The end of the pin 78 extending toward the adjacent side frame member 5 is in the form of a cam follower which engages in a cam track or slot 72 formed in the adjacent side frame member 5 and having the shape illustrated in Figs. 7 and 9 to 15. Finally, the pin 78 is connected to one end of a rod 88 (Fig. 9) which at its other end is connected to the related chains 60 thereby causing the pin 78 to travel around the cam track 72 in response to the movement of the chain 60 around the sprockets 61 and 62. The movement of the pin 78 along the cam track 72 effects the positive movement of the double-armed lever 76—81 and of the lever or arm 74 by reason of the engagement of the pin 78 within the slot 77 of the lever arm 76. The various phases of the movements of the double-armed lever 76—81 and of the arm 74 will be specifically discussed below.

A cross-bar structure 82 is fixedly connected at its opposite ends to the lever arms 81 of the double-armed levers 76—81 included in the bar manipulating devices at the opposite sides of the machine. A cylindrical roller 84 extends transversely across the machine and at its opposite ends is rotatably supported on links 84a which are pivotally connected by pins 83 to the cross-bar structure. Thus, the roller 84 is rotatable about its own longitudinal axis and is also bodily swingable about the axis defined by the pins 83 relative to the cross-bar 82, for example, between the positions of Fig. 7 and of Fig. 8.

A stop member or abutment 90 (Fig. 7) extends from the adjacent side frame member 5 to engage a finger 89 formed as an extension of the lever arm 76 in the manner hereinafter described for reversing the direction of swinging of the double-armed lever 76—81 about the pivot 75 when the pin 78 approaches the upper portion of the cam track 72.

In the illustrated arrangement (Fig. 7), devices are provided for simultaneously manipulating two bars 51 so that the strands of dough extruded by the two banks of nozzles will be hung upon the bars. In order to ensure that the actions or movements of the two bars will be exactly simultaneous, the bar carriers 79 of the two devices at each side of the machine are connected together by a rigid connecting member 85 which is formed with bent portions (Fig. 7) so as to avoid any interference with the movements of the cross-bar 82 or the roller 84.

In order to control the speed of the swinging movements of the lever or arm 74, a band brake 86 (Fig. 7) is provided around the axle or pin 73 and includes an adjustment screw 87 for varying the frictional contact between the pin 73 and band brake 86.

The operation of the above described machine will now be set forth with particular reference being had to Figs. 9 to 15 of the drawings.

Each of the banks or rows of nozzles 4 operates continuously to extrude dough thereby forming a curtain of strands or filaments of dough in a vertical plane within the machine. The stands or filaments of dough pass downwardly between the rotating and fixed blades 63 and 65, respectively, of the related upper shearing assembly, which are then separated as shown in Fig. 9, and in front of the roller 84. While the formation of the curtain of strands of dough has been proceeding, the conveyor chains 49 and the hook members 54 thereon, have been removing the bars 51, one at a time, from the magazine slots 53 and carrying such bars horizontally through the machine. When a bar 51 has been transported to the vicinity of the vertical plane occupied by the strands of dough, the portion of the transmission assembly associated with the sprocket 26 halts the rotation of the latter to bring the conveyor to rest. During the movement of the conveyor, the sprocket 36 has been held immobile by its part of the transmission assembly 15 so that the upper shearing assemblies and the bar manipulating devices have been inactive. Further, since the lower shearing assemblies are continuously operative, the latter act to trim the lower ends of the strands of extruded dough just as a bar 51 comes into position immediately in front of the curtain of strands of extruded dough (Fig. 9). During the final portion of the movement of a bar 51 into its rest position of Fig. 9, the opposite end portions of the bar move onto the bar carriers 79 and are held on the latter by the latches 80. When the conveyor comes to rest with a bar 51 engaged by the bar carriers 79, rotation of the sprocket 36 then commences thereby causing movement of the chains 60 and of the cam 71 which controls the clutch interposed in the drive for the upper shearing assemblies.

As viewed in Fig. 9, the chain 60 moves so that the left and right hand runs thereof travel upwardly and downwardly, respectively. Since the bar 51 and the pivot pin 78, which engages in the cam track 72, are in axial alignment, the pin 78 is hidden behind the bar represented by the black dot 51 in Figs. 9 to 15. As movement of chain 60 commences and is communicated by link 88 to the pin 78, the latter begins to move up the left hand portion of cam track 72, as viewed in Fig. 10. During such initial movement of the pin 78, acting as a cam follower, the double-armed lever 76—81 rocks around the pivot 75 in the clockwise direction (as viewed in Fig. 10) so that the roller 84 moves forwardly and the bar 51 moves rearwardly against the strands of dough to bend the latter around the bar 51. As the pin 78 moves upward in the cam track 72, the bar 51 is elevated further, as in Fig. 11, and the double-armed lever 76—81 continues to rock in the clockwise direction to increasingly bend the strands of dough around the bar 51. During the phases of movement illustrated by Figs. 9, 10 and 11, the pin 78 has been slidably accommodated in the slot 77 of the double-armed lever 76—81 so that no swinging of the lever 74 has occurred. However, when the position of Fig. 11 has been reached, the pin 78 engages the end of slot 77, and further upward movement of the pin 78 in the cam track 72 produces swinging of the lever 74 about its pivot 73. Since the left hand portion of the cam track 72 (as viewed in Figs. 9–15) increasingly deviates from the circular path described by the pin 75 about the pivot 73, the lever 74 and the double-armed lever 76—81 finally reach a dead center position (Fig. 12) in which these levers are longitudinally aligned. Further movement of the pin 78 (behind the bar 51) along the cam track 72 would normally cause the double-armed lever 76—81 to continue its clockwise swinging about the pivot 75, however, then the roller 84 would pass below the bar 51 and strike against the strands of dough hanging from the bar. In order to prevent this occurrence, the stop or abutment 90 is disposed to engage the extension or finger member 89 of the double-armed lever 76—81 when the latter reaches the dead-center position relative to lever 74, as shown in Fig. 12. Thereafter, further upward movement of the pin 78 in the cam track 72 causes the double-armed lever 76—81 to swing in the counter-clockwise direction (as viewed in Fig. 13) about the pivot 75 relative to the lever 74, and thereby causes the lever 74 to continue to swing upwardly about its pivot 73 until the pin 78 reaches that point on the upper part of the cam track 72 which intersects the circular path followed by the pivot 75.

As the pin 78 and the bar 51 aligned therewith reach the uppermost portion of the cam track 72, the cam 71 (Fig. 2) has reached the position in which it effects engagement of the clutch portions 68 and 69 so that the upper shearing assembly then becomes operative to sever the threads of dough and the latter are now free to hang from the bar 51 (Fig. 13) but with the opposite ends of unequal lengths. When the follower pin 78 has passed the point on the cam track 72 which intersects the circular path of pivot 75 and begins its descent along the right-hand portion of the cam-track (as viewed in Fig. 14), the bar 51 is lowered and the lever 74 swings downwardly until the bar is returned to the conveyor (Fig. 15) and the parts of the bar manipulating device are returned to their original positions. When the bar 51 has been returned to its position on the conveyor chains 49, the ends of the threads of dough hanging from the bar fall into the horizontal cutting planes of the continuously operated lower shearing assemblies (Fig. 15) and the latter trim the ends of the strands of dough to uniform lengths. The continuous and rapid rotation of the blades of the lower shearing assemblies ensures that the lengths of dough trimmed from the depending strands will be relatively small and hence readily re-usable.

When the bar 51 has been returned to the conveyor chains, as described above, the driving sprocket 26 is again activated while the driving sprocket becomes inoperative, thereby halting the action of the bar manipulating devices and causing the conveyor to remove the loaded bar from the position of vertical alignment with the nozzles 4 and replacing such loaded bar by an empty one in preparation for the repetition of the above described cycle of operation.

While a specific embodiment of the present invention has been illustrated and described in detail, it is to be understood that the invention is not limited to that precise embodiment and that various changes and modifications may be made therein without departing from the scope of the invention as defined in the appended claims.

What is claimed is:

1. A machine for cutting elongated strands of dough extruded downwardly from rows of nozzles and for suspending the cut strands of dough from transverse bars; said machine comprising upper and lower shearing means disposed in vertical alignment with each row of nozzles and vertically spaced from each other, said upper and lower shearing means having horizontal cutting planes intersecting the vertical plane of emergence of the strands of dough extruded from the related row of nozzles, means for intermittently actuating said upper shearing means and for continuously actuating said lower shearing means, conveyor means for carrying successive transverse bars along a horizontal path intersecting said vertical plane of emergence of the extruded strands of dough at a location between said upper and lower shearing means, means for intermittently advancing said conveyor means so that the successive bars carried by the latter are brought to rest, one at a time, at a location immediately in front of said vertical plane of emergence, bar manipulating and dough guiding means including two laterally spaced apart lever assemblies, each of said lever assemblies having an elongated arm pivotally mounted at one end for swinging in a vertical plane about a fixed pivot and a double-armed lever rotatably mounted on the free end of said elongated arm, a thread bundle guiding roller extending laterally, means at the end of one arm of said double-armed lever supporting the adjacent end of said laterally extending thread guiding roller, the other arm of said double-armed lever having a longitudinal slot therein, a follower pin extending through each of said slots and carrying a related grasping device for grasping the adjacent end of the successive bars carried by said conveyor means, a continuous cam track adjacent each of said lever assemblies and receiving the related follower pin, said cam track extending upwardly and rearwardly through said vertical plane of emergence and then downwardly and forwardly to guide the successive bars held by said grasping devices along a corresponding path and back to the original position on said conveyor means, a fixed abutment member adjacent each of said lever assemblies and operative to engage a portion of said double-armed lever when the latter is substantially in longitudinal alignment with the related elongated arm for reversing the direction of swinging of said double-armed lever with respect to said elongated arm, means operative to effect movement of said follower pin along the related cam track during the inactive periods of said conveyor means, and means controlling the intermittent operation of said upper shearing means so that the latter is actuated only when the lifted bar held by said grasping devices has reached its uppermost position along said path.

2. A machine according to claim 1; wherein said horizontal path of the bars carried by said conveyor means intersects said vertical plane of emergence at a distance above the cutting plane of said lower shearing means equal to substantially one half the length of the cut strands of dough to be suspended from the bars.

3. A machine according to claim 1; wherein said conveyor means includes continuous chains moving along said horizontal path and having spaced hook members thereon to engage behind successive bars disposed on said chains.

4. A machine according to claim 1; wherein said means for effecting the movement of said follower pin along the related cam track includes rotatable sprockets disposed adjacent the upper and lower portions of said closed cam track, a continuous chain trained around said sprockets, a link connected to said chain and to said follower pin, and means for effecting the advance of said chain around said sprockets.

5. A machine according to claim 1; wherein said means for intermittently actuating said upper shearing means and for continuously actuating said lower shearing means includes continuously operative driving means, means connecting said driving means to said lower shearing means, means for operatively connecting said lower shearing means to said upper shearing means and having a disengageable clutch interposed therein, and rotatable cam means for controlling the engagement and disengagement of said clutch.

6. A machine according to claim 1; wherein said means for effecting movement of the follower pin, for effecting intermittent operation of said conveyor means and for controlling the intermittent operation of said upper shearing means include a driving shaft, means for continuously rotating said driving shaft, a fixed shaft disposed parallel to and spaced from said driving shaft, a first driving element rotatably mounted on said fixed shaft, a first driven element rotatably mounted on said fixed shaft and carrying a first coupling element which is swingable into and out of the path of said first driving element, meshing gear means fixed to said driving shaft and to said first driving element for effecting the rotation of the latter, first cam means rotatable on said fixed shaft to engage said first coupling element and move the latter into the path of said first driving element, meshing gear means fixed to said driving shaft and to said first cam means for effecting rotation of the latter, a first disc fixed on said fixed shaft and having a peripheral notch to receive said first coupling element when the latter is disposed out of said path of the first driving element, and spring means continuously urging said first coupling element in the direction out of said path of the first driving element, and means operatively connecting said first driven element to said conveyor means.

7. A machine according to claim 6; wherein said means for effecting movement of the follower pin, for effecting intermittent operation of said conveyor means and for controlling the intermittent operation of said upper shearing means further include a second driving element rotatable on said fixed shaft, a second driven element rotatably mounted on said fixed shaft and carrying a second coupling element which is swingable into and out of the path of said second driving element, meshing gear means fixed to said driving shaft and to said second driving element for effecting rotation of the latter, spring means continuously urging said second coupling element to swing in the direction out of said path of the second driving element, a second disc fixed on said fixed shaft and having a peripheral notch for receiving said second coupling element, a third disc rotatable on said fixed shaft and having a peripheral notch for receiving said second coupling element to permit the latter to swing out of the path of said second driving element when said peripheral notches of the second and third discs are axially aligned, meshing gear means driven by said second driven element and driving said third disc for effecting rotation of the latter in response to rotation of said second driven element, second cam means rotatable on said fixed shaft to engage said second coupling and move the latter out of said peripheral notches of said second and third discs and into the path of said second driving element, means operatively connecting said second driven element to said means for effecting movement of the follower pin, means for rendering the actuating means of said upper shearing means alternately operative and inoperative, and means operatively connecting said second driven element to the last mentioned means for controlling the operation of the latter.

8. A machine of the described character comprising a plurality of spaced apart and parallel rows of nozzles for extruding strands of dough in spaced apart vertical planes, conveyor means operative to carry successive laterally extending bars along a horizontal path intercepting said vertical planes, said conveyor means including spaced apart members for positioning the bars in spaced apart parallel relationship on the conveyor means with a distance between successive bars equal to the distance between the rows of nozzles divided by a number equal to the number of rows of nozzles plus one, conveyor driving means operative during each cycle of the machine to advance said conveyor means a distance equal to the product of the number of rows of nozzles and the distance between the successive bars on said conveyor means and to bring said conveyor means to rest during a portion of each operating cycle with a bar thereon disposed at a location immediately in front of the vertical plane extending through each of said rows of nozzles, upper and lower shearing means disposed above and below said horizontal path of the conveyor means and having horizontal cutting planes intersecting said vertical planes of the extruded strands of dough, means for continuously actuating said lower shearing means and for intermittently actuating said upper shearing means, bar manipulating and dough guiding means for each of the rows of nozzles and including two laterally spaced apart lever assemblies, each of said lever assemblies having a first lever pivotally mounted at one end for swinging in a vertical plane about a fixed pivot and a double-armed lever rotatably mounted intermediate its ends on the free end of said first lever, a thread bundle guiding roller extending laterally between said lever assemblies, means at the end of one arm of said double-armed lever supporting the adjacent end of said roller, the other arm of said double-armed lever having a longitudinal slot therein, a follower pin extending through said slot and supporting a related bar carrier for carrying the adjacent end of each of the successive bars disposed at said location during said portion of each cycle when said conveyor means is at rest, a continuous cam track adjacent each of said lever assemblies and receiving the related follower pin, said cam track extending upwardly and rearwardly from said location through said vertical plane of emergence of the related row of nozzles and then downwardly and forwardly back to said location to guide the related bar carrier along a corresponding path, a fixed abutment member adjacent each of said lever assemblies and operative to engage a portion of said double-armed lever when the latter is substantially in longitudinal alignment with the related first lever for reversing the direction of swinging of said double-armed lever relative to said first lever, and means operative to effect movement of said follower pin along the entire related cam track during said portion of each cycle when said conveyor means is at rest and to control the intermittent operation of said upper shearing means so that the latter is actuated only when said double-armed levers engage said fixed abutment members and said bar carriers are at their uppermost positions.

9. A machine according to claim 8; wherein said horizontal path of the conveyor means intersects said vertical planes passing through the rows of nozzles at distances above said lower shearing means equal to substantially one half the length of the cut strands of dough to be suspended from the bars.

10. A machine according to claim 8; wherein said means operative to move the follower pin around the closed cam track includes rotatable sprockets disposed adjacent the upper and lower portions of said cam track, chain means trained around said sprockets, and a link connected at one end to said chain means and at its other end to said follower pin.

11. A machine according to claim 8; wherein the portion of said cam track extending upwardly and rearwardly has an initial part shaped to effect swinging of said double-armed lever member about its pivoting axis on said first lever in the direction causing forward and downward movement of said roller and upward and rearward movement of said follower pin and bar carrier so that said roller acts to wrap the strands of dough around a bar carried by said bar carriers.

12. A machine according to claim 11; wherein said initial part of the upwardly and rearwardly extending portion of the cam track runs into a contiguous part deviating increasingly from the circular arc followed by said free end of the first lever so that said double-armed lever member and said first lever come into longitudinal alignment as said follower pin approaches the uppermost end of said contiguous part, and wherein said portion of the double-armed lever is in the form of a finger member extending longitudinally from said other arm of the double-armed lever in the direction away from the pivoting axis of the latter to engage said fixed abutment member positioned from below as said follower pin approaches said uppermost end of the contiguous part whereby further upward movement of said follower pin causes said double-armed lever to rock in the direction moving said roller upwardly and rearwardly relative to said follower pin and bar carrier so that said roller remains clear of the strands of dough suspended from the carried bar.

13. A machine according to claim 8; wherein said means for intermittently actuating said upper shearing means and for continuously actuating said lower shearing means includes continuously operative driving means, means connecting said driving means to said lower shearing means, means for operatively connecting said lower shearing means to said upper shearing means and having a disengageable clutch interposed therein, and rotatable cam means for controlling the engagement and disengagement of said clutch.

14. A machine according to claim 13; wherein said means operative to effect movement of said follower pin when said conveyor means is at rest includes a driving shaft, means for continuously rotating said driving shaft, first and second driven elements rotatably mounted adjacent said driving shaft, coupling means associated with each of said driven elements operative to individually connect the related driven element with said driving shaft for rotation by the latter, control means actuated by said driving shaft for alternately rendering operative said coupling means associated with said first and second driven elements, means connecting said conveyor driving means to said first driven element for actuation by the latter, chain and sprocket means extending along said cam track and operatively connected to said follower pin, means connecting said chain and sprocket means to said second driven element for actuation by the latter, and means operatively connecting said clutch control cam means to said second driven element for actuation by the latter.

References Cited in the file of this patent

UNITED STATES PATENTS

| Number | Name | Date |
|---|---|---|
| 1,257,966 | Barducci | Mar. 5, 1918 |
| 1,627,297 | Surico | May 3, 1927 |
| 2,208,900 | Giezendanner | July 23, 1940 |
| 2,223,352 | De Francisci | Dec. 3, 1940 |